United States Patent
Wilkosz et al.

(10) Patent No.: US 9,786,928 B2
(45) Date of Patent: *Oct. 10, 2017

(54) PROTON EXCHANGE MEMBRANE FUEL CELL WITH STEPPED CHANNEL BIPOLAR PLATE

(75) Inventors: Daniel E. Wilkosz, Saline, MI (US); Ronald David Brost, Whitefish, MT (US); Thomas A. Wagner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 585 days.

This patent is subject to a terminal disclaimer.

(21) Appl. No.: 13/593,562

(22) Filed: Aug. 24, 2012

(65) Prior Publication Data
US 2014/0057193 A1    Feb. 27, 2014

(51) Int. Cl.
*H01M 8/0254* (2016.01)
*B60L 11/18* (2006.01)
*H01M 8/026* (2016.01)

(52) U.S. Cl.
CPC ....... *H01M 8/0254* (2013.01); *B60L 11/1883* (2013.01); *B60L 11/1898* (2013.01); *H01M 8/026* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 5,798,188 A | 8/1998 | Mukohyama et al. | |
| 6,261,710 B1 | 7/2001 | Marianowski | |
| 6,649,297 B1 | 11/2003 | Marchand et al. | |
| 7,005,209 B1 | 2/2006 | Gaines et al. | |
| 7,087,337 B2 | 8/2006 | Trabold et al. | |
| 7,309,540 B2 | 12/2007 | Wang | |
| 7,468,217 B2 | 12/2008 | Mizuno | |
| 7,531,100 B2 | 5/2009 | Peters et al. | |
| 7,618,734 B2 | 11/2009 | Rapaport et al. | |

(Continued)

FOREIGN PATENT DOCUMENTS

| | | |
|---|---|---|
| CN | 102270767 A | 12/2011 |
| GB | 2339058 A | 1/2000 |

(Continued)

OTHER PUBLICATIONS

H.C. Liu et al., Reactant Gas Transport and Cell Performance of Proton Exchange Membrane Fuel Cells With Tapered Flow Field Design, Journal of Power Sources, www.sciencedirect.com, Oct. 28, 2005, 10 pgs.

(Continued)

*Primary Examiner* — Patrick Ryan
*Assistant Examiner* — Carmen Lyles-Irving
(74) *Attorney, Agent, or Firm* — Damian Porcari; Brooks Kushman P.C.

(57) ABSTRACT

A fuel cell stack includes a membrane electrode assembly and a bipolar plate. The bipolar plate has a corrugated portion defined by an adjacent pair of proximal and distal peak portions and a sidewall segment connecting the peak portions. The sidewall segment and membrane electrode assembly at least partially define a flow channel. The sidewall segment includes a shoulder portion defining a step spaced away from the peak portions.

7 Claims, 3 Drawing Sheets

(56) References Cited

U.S. PATENT DOCUMENTS

| | | |
|---|---|---|
| 7,659,024 B2 | 2/2010 | Matsumoto et al. |
| 7,687,175 B2 | 3/2010 | Abd Elhamid et al. |
| 7,687,182 B2 | 3/2010 | Goebel et al. |
| 2001/0028974 A1 | 10/2001 | Nakata et al. |
| 2002/0119358 A1* | 8/2002 | Rock ................................ 429/32 |
| 2004/0170883 A1 | 9/2004 | Bartholomeyzik et al. |
| 2004/0247978 A1* | 12/2004 | Shimamune .................... 429/34 |
| 2005/0064270 A1 | 3/2005 | Marianowski |
| 2007/0015019 A1 | 1/2007 | Baschek et al. |
| 2010/0015502 A1 | 1/2010 | Jiang et al. |
| 2010/0075186 A1 | 3/2010 | Amemiya |
| 2010/0129731 A1 | 5/2010 | Warrier et al. |
| 2011/0229823 A1* | 9/2011 | Rock et al. .................. 430/315 |

FOREIGN PATENT DOCUMENTS

| | | |
|---|---|---|
| JP | H01279573 A | 11/1989 |
| JP | 2005317292 A | 11/2005 |

OTHER PUBLICATIONS

J. Shang et al., Commercialization of Fuel Cell Bipolar Plate Manufacturing by Electromagnetic Forming, 4th International Conference on High Speed Forming 2010, 10 pgs.

\* cited by examiner

PROTON EXCHANGE MEMBRANE FUEL CELL WITH STEPPED CHANNEL BIPOLAR PLATE

TECHNICAL FIELD

This disclosure relates to proton exchange membrane (PEM) fuel cells and to the construction and arrangement of bipolar plates therein.

BACKGROUND

A proton exchange membrane fuel cell is an electrochemical energy conversion device that converts hydrogen and oxygen into water, and in the process produces electricity. Hydrogen fuel is channeled through flow fields to an anode on one side of the fuel cell. Oxygen (from the air) is channeled through flow fields to a cathode on the other side of the fuel cell. At the anode, a catalyst causes the hydrogen to split into hydrogen ions and electrons. A polymer electrolyte membrane disposed between the anode and cathode allows the positively charged ions to pass through it to the cathode. The electrons travel through an external circuit to the cathode, which creates an electrical current. At the cathode, the hydrogen ions combine with the oxygen to form water, which flows out of the cell.

SUMMARY

A vehicle includes a fuel cell stack arranged to provide power to move the vehicle. The fuel cell stack includes a membrane electrode assembly and a bipolar plate having a corrugated portion defined by (i) a series of alternating proximal and distal peak portions and (ii) respective sidewall segments connecting each adjacent pair of the proximal and distal peak portions. The proximal portions are in contact with the membrane electrode assembly such that each of the sidewall segments and membrane electrode assembly at least partially define a plurality of flow channels each having a width and a depth at least equal to the width. Each of the sidewall segments includes at least one shoulder portion such that the bipolar plate has a generally uniform thickness. The depth of one of the flow channels can be greater than the width of the one of the flow channels. The thickness of the bipolar plate can be approximately 250 microns. The bipolar plate can be formed from metal. The bipolar plate can be formed from stainless steel foil.

A fuel cell stack includes a membrane electrode assembly and a pair of bipolar plates electrically connected together. At least one of the bipolar plates has a corrugated segment defined by peak portions and a sidewall connecting the peak portions. The sidewall has end portions and a body portion disposed between the end portions. Each of the end portions is adjacent to one of the peak portions. The sidewall and membrane electrode assembly at least partially define a flow channel. The sidewall includes at least one shoulder portion formed in the body portion. The fuel cell stack can further include a plate disposed between and in contact with the pair of bipolar plates. The flow channel can have a width and a depth greater than the width. The at least one bipolar plate can have a generally uniform thickness. The thickness of the at least one bipolar plate can be approximately 100 microns. The at least one bipolar plate can be formed from metal. The at least one bipolar plate can be formed from stainless steel foil.

A vehicle includes a fuel cell stack arranged to provide power to move the vehicle. The fuel cell stack includes a membrane electrode assembly and a bipolar plate having an adjacent pair of proximal and distal peak portions and a sidewall segment connecting the peak portions. The sidewall segment and membrane electrode assembly at least partially define a flow channel. The sidewall segment includes a shoulder portion defining a step spaced away from the peak portions. The flow channel can have a width and a depth greater than the width. The bipolar plate can have a generally uniform thickness. The thickness of the bipolar plate can be approximately 100 microns. The bipolar plate can be formed from metal. The bipolar plate can be formed from stainless steel foil.

DETAILED DESCRIPTION

Figure 1:
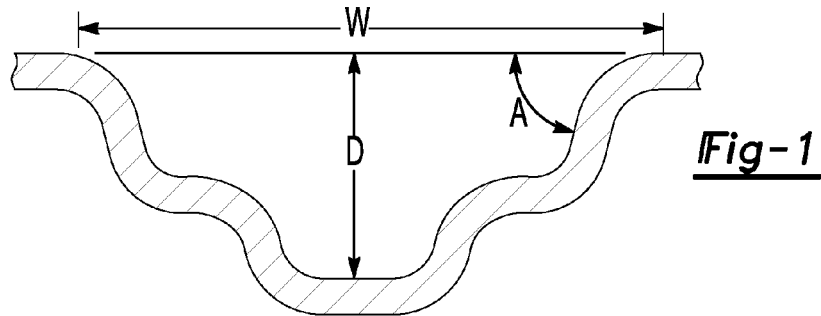
FIG. 1 is a diagrammatic cross-sectional view of a bipolar plate flow channel. Channel width is labeled with a "W" and channel depth is labeled with a "D."

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Candidate metallic bipolar plate (MBPP) materials can be formed into a series of channels having widths and depths designed to satisfy desired fuel cell performance criteria. To increase fuel cell performance, deep, narrow channels with vertical side wall geometries essentially mimicking a flat bottom "U" are preferred in certain circumstances. Such geometries, however, can be difficult or impossible to form from thin metallic materials in a cost effective manner. Formability limits of certain thin metallic materials, such as stainless steel foil, can thus restrict their usage as MBPP materials for fuel cell applications. For example, stamping deep, straight channels into thin metallic materials can produce excessive material thinning at channel geometry transition regions such as at channel edges. Such thinning can result in tearing of the plate during channel formation, assembly of the fuel cell, or operation of the fuel cell stack. Moreover, to the extent that the bipolar plate is a structural component of the fuel cell stack, such thinning can compromise the rigidity of the bipolar plate.

Conventional MBPP designs commonly feature channels with cross-sections resembling a flat-bottom "V" (or trapezoidal shape). These configurations tend to have moderate side wall angles and restricted channel depths in an effort to accommodate the forming limits of the precursor plate material and to minimize strain-induced thinning during the forming process. In some cases, base alloy processing steps can be altered to improve the ability of MBPP precursor materials to form past their normal limits. Alteration of the material base chemistry or manufacturing process, however, can detrimentally impact other characteristics desired of an alloy to be used in fuel cell applications such as corrosion resistance and electrical conductivity. Changes in material composition and processing can also be cost prohibitive.

In fuel cells, increasing flow channel cross-sectional area, particularly on the cathode side of the respective membrane electrode assembly (MEA), can substantially increase fuel cell performance. If the channel opening is too wide, however, the MEA can bow inward toward the channel. For this reason, it could be preferable for the channels to be formed with narrower openings and deeper channels.

The ability to form MBPPs with deeper channels, particularly when the channels are formed by a stamping process, can be improved by altering the forming limits of the precursor plate material at the expense of other characteristics as mentioned above. It has been discovered, however, that altering channel geometry to accommodate the inherent forming limits of the selected precursor material can also improve the ability to form MBPPs with deeper channels without significantly impacting such characteristics as corrosion resistance and electrical conductivity. Disclosed herein are examples of "stepped" sidewall MBPP channel geometries as shown, for example, in FIG. 1. Flow channels with stepped sidewalls can be distinguished from the more traditional trapezoidal channel configuration shown in FIG. 2.

The segments of the sidewall forming the shoulder (or step) need not form a 90 degree angle relative to each other. Any suitable angle (e.g., 80 degrees, 100 degrees, etc.) that permits deep channel formation without significant thinning can be used. Testing and/or simulation can determine optimum step dimensions.

Figure 2:
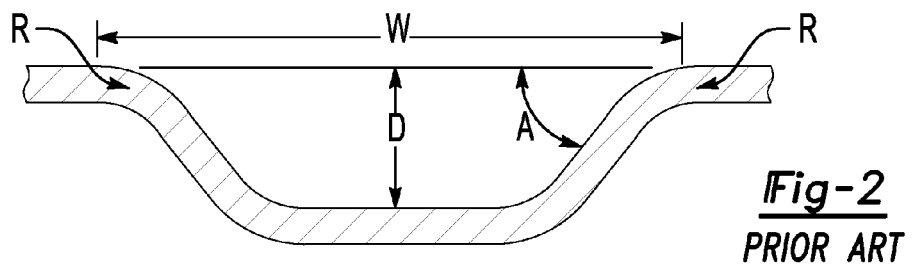
FIG. 2 is a diagrammatic cross-sectional view of a conventional bipolar plate flow channel having a trapezoidal shape.

Finite element analysis (FEA) of the stepped sidewall geometry (shown, for example, in FIG. 1) has been compared to FEA of a traditional trapezoidal-shaped channel (shown, for example, in FIG. 2) with equivalent depth. This comparison revealed that material thinning of the stepped geometry of FIG. 1 is far less than that of the trapezoidal channel geometry of FIG. 2, and material strain across the stepped sidewall geometry of FIG. 1 is more balanced. The FEA comparison also revealed that for the equivalent channel depth, D, the trapezoidal channel of FIG. 2 is more likely to experience material failure in its highly strained upper radius zones, R. The FEA model results have been empirically verified in further studies. Usage of the stepped sidewall geometry similar to that illustrated in FIG. 1 could allow for deeper channels with greater sidewall angles, A, to be formed from existing metallic materials while maintaining acceptable channel opening widths W. These two characteristics can result in improved fuel cell stack operational performance without diminishing the structural integrity of interfacing fuel cell stack components.

Figure 3:
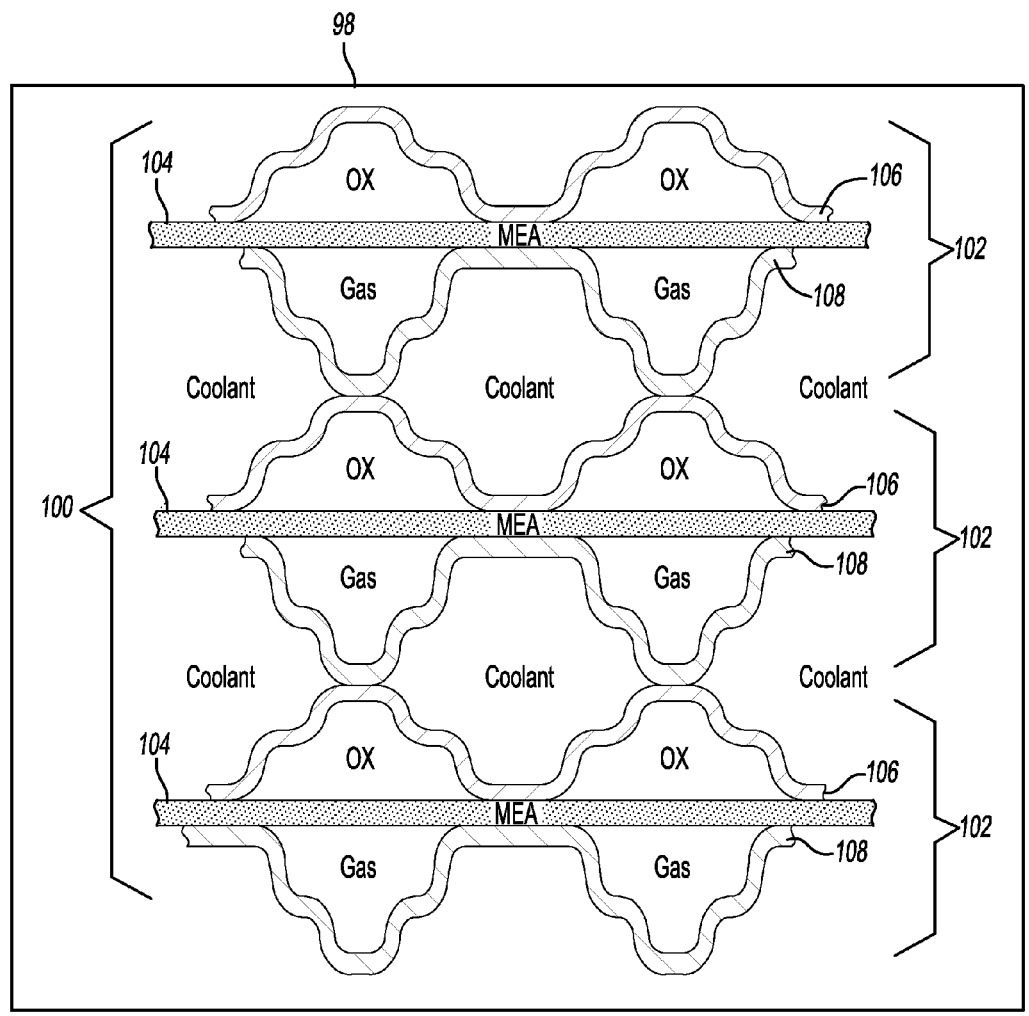
FIG. 3 is a diagrammatic cross-sectional view of a fuel cell stack disposed within a vehicle and including bipolar plates having flow channels defined at least partially by stepped sidewalls.

Referring to FIG. 3, a vehicle 98 such as a car can include a fuel cell stack 100 arranged, as known in the art, to provide power to move the vehicle 98. The fuel cell stack 100 can include a plurality of fuel cells 102 electrically connected together. Each of the fuel cells 102 can include a membrane electrode assembly (MEA) 104 disposed between first and second bipolar plates 106, 108. The membrane electrode assembly 104 includes a cathode portion on one side and an anode portion on the other side. Where the term "Gas" is used in the figures, it is intended to represent the fuel of the fuel cell 102 exposed to the anode side of the MEA 104. In a hydrogen fuel cell, for example, the Gas would be hydrogen gas. Where the term "OX" is used in the figures, it is intended to represent oxygen (or air containing oxygen) exposed to the cathode side of the MEA 104.

Figure 4:
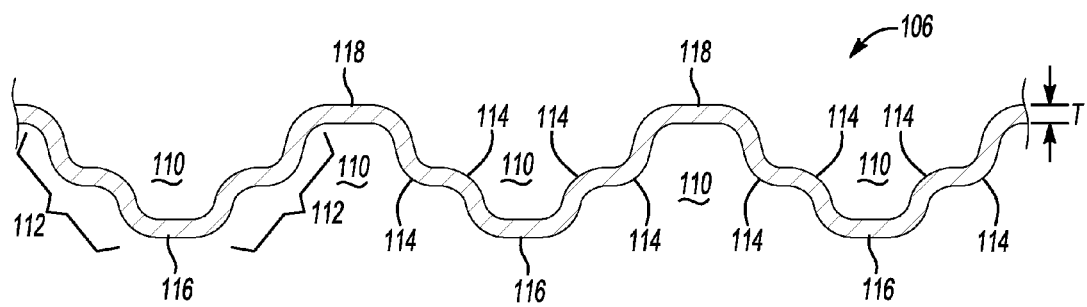
FIG. 4 is a diagrammatic cross-sectional view of a bipolar plate having flow channels at least partially defined by stepped sidewalls.

Referring to FIG. 4, each of the bipolar plates 106 can be stamp-formed from a precursor metal sheet such as a sheet of stainless steel foil or other appropriate conductive metallic material. Alternative forming methods such as hydroforming and adiabatic forming can also be used. Each of the bipolar plates 106 defines adjacently aligned flow channels 110 (normal to the page) alternately disposed on opposing sides of the bipolar plate 106. Further, each of the bipolar plates 106 includes at least partially stepped sidewalls 112 having shoulder portions 114, and proximal and distal peak portions 116, 118 where the stepped sidewalls 112 connect with each other (giving the bipolar plate 106 a corrugated appearance). Hence, each of the stepped sidewalls 112, in this example, have two end portions and a body portion disposed between the end portions. Each of the end portions is adjacent to one of the peak portion 116, 118. The shoulder portions 114 are formed in the body portions. The proximal peak portions 116 of each bipolar plate 106 can be in direct contact with the MEA 104 (FIG. 3). The distal peak portions 118 of adjacent bipolar plates can be aligned and in electrical contact with one another.

Particularly in instances in which the bipolar plates 106 are stamp-formed, the bipolar plates 106 can have a substantially uniform web thickness, T. Such thickness can be, for example, in the range of approximately 100 microns. Any suitable thickness, however, can be used (e.g., 80 to 250 microns, etc.) A similar description applies to the bipolar plates 108 of FIG. 3.

Figure 5:
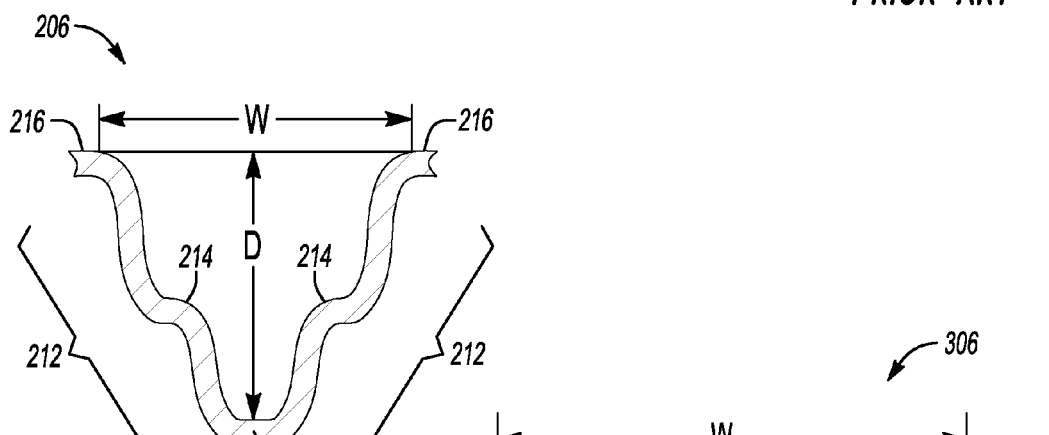
FIG. 5 is a diagrammatic cross-sectional view of a bipolar plate flow channel. The channel depth is at least equal to the channel width. Like numbered elements among the various figures can have similar descriptions.

Referring to FIG. 5, a portion of a bipolar plate 206 includes at least partially stepped sidewalls 212 having shoulder portions 214 and proximal and distal peak portions 216, 218 respectively. The channel depth, D, in this example, is at least as equal to the channel width, W. In other examples, the channel depth, D, can be greater than the channel width, W. For example, D can be approximately 500 microns and W can be approximately 100 microns.

Figure 6:
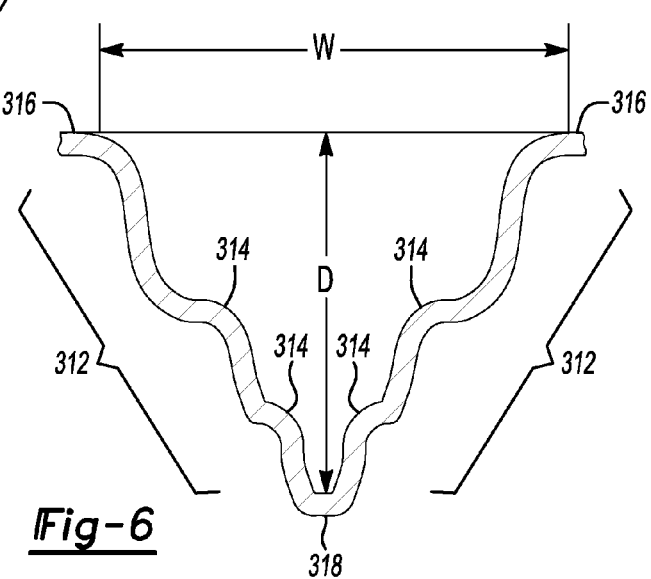
FIG. 6 is a diagrammatic cross-sectional view of a bipolar plate flow channel. The sidewalls each include two shoulder projections.

Referring to FIG. 6, a portion of a bipolar plate 306 includes at least partially stepped sidewalls 312 having shoulder portions 314 and proximal and distal peak portions 316, 318 respectively. In this example, each of the stepped sidewalls 312 can have two (or more) shoulder portions 114. Other configurations are also contemplated.

Figure 7:
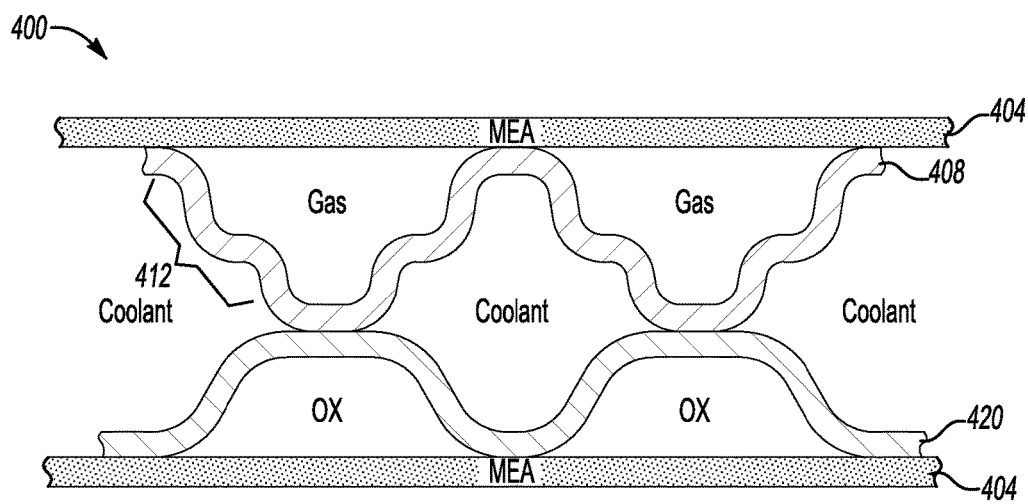
FIG. 7 is a diagrammatic cross-sectional view of a junction between two adjacent fuel cells of a fuel cell stack. The bipolar plates of the fuel cells are in contact with each other. One of the bipolar plates has flow channels at least partially defined by stepped sidewalls. The other of the bipolar plates has flow channels which are trapezoidal in shape.

Referring to FIG. 7, a portion of a fuel cell stack 400 includes MEAs 404 and bipolar plates 408, 420 in contact with each other and disposed between the MEAs 404. In this example, the bipolar plate 408 includes stepped sidewalls 412 and the bipolar plate 420 does not.

Figure 8:
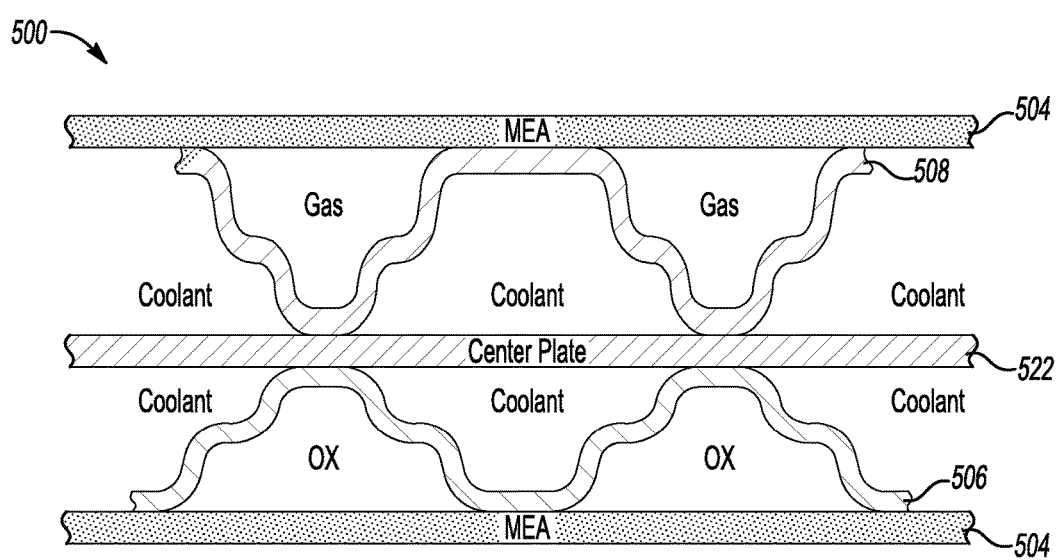
FIG. 8 is a diagrammatic cross-sectional view of a junction between two adjacent fuel cells of a fuel cell stack including a centerplate disposed between and in contact with bipolar plates of the fuel cells.

Referring to FIG. 8, a portion of a fuel cell stack 500 includes MEAs 504, bipolar plates 506, 508, and a center plate 522. The center plate 522 is disposed between and in contact with the bipolar plates 506, 508 to prevent nesting of adjacent bipolar plates and to increase the number of coolant flow channels associated with the bipolar plates 506, 508. Other arrangements are also contemplated.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a fuel cell stack to power the vehicle and including
      a membrane electrode assembly (MEA) and
      a bipolar plate having
         an adjacent pair of proximal and distal peak portions and
         a sidewall connecting the peak portions, partially defining a flow channel with the MEA, and including shoulder segments formed with a relative angle therebetween in a range of 40 to 140 degrees to define a step spaced away from the peak portions.

2. The vehicle of claim 1 wherein the flow channel has a width and a depth greater than the width.

3. The vehicle of claim 1 wherein the bipolar plate has a generally uniform thickness.

4. The vehicle of claim 1 wherein a thickness of the bipolar plate is approximately 100 microns.

5. The vehicle of claim 1 wherein the bipolar plate is formed from metal.

6. The vehicle of claim 1 wherein the bipolar plate is formed from stainless steel foil.

7. The vehicle of claim 1 wherein the shoulder segments are formed with a relative angle therebetween in a range of 80 to 100 degrees.

* * * * *